P. SCHMIEDER.
ROTARY METALLURGICAL FURNACE FOR ROASTING ZINC ORES AND THE LIKE.
APPLICATION FILED JUNE 8, 1911.

1,004,916.

Patented Oct. 3, 1911.
2 SHEETS—SHEET 1.

Witnesses:
John C. Sanders
Leon Spring

Inventor:
Paul Schmieder
BY Wm Wallace White
ATT'Y.

P. SCHMIEDER.
ROTARY METALLURGICAL FURNACE FOR ROASTING ZINC ORES AND THE LIKE.
APPLICATION FILED JUNE 8, 1911.

1,004,916.

Patented Oct. 3, 1911.

2 SHEETS—SHEET 2.

(II-II).

Witnesses:
John C. Sanders
Leon Spring

Inventor:
Paul Schmieder
BY Wm. Wallace White
ATT'Y

UNITED STATES PATENT OFFICE.

PAUL SCHMIEDER, OF LIPINE, GERMANY.

ROTARY METALLURGICAL FURNACE FOR ROASTING ZINC ORES AND THE LIKE.

1,004,916. Specification of Letters Patent. Patented Oct. 3, 1911.

Application filed June 8, 1911. Serial No. 631,954.

*To all whom it may concern:*

Be it known that I, PAUL SCHMIEDER, a subject of the King of Prussia, German Emperor, and resident of Lipine, in Upper Silesia, in the Kingdom of Prussia, German Empire, metallurgical engineer, have invented a new and Improved Rotary Metallurgical Furnace for Roasting Zinc Ores and the Like, of which the following is a specification.

This rotary metallurgical furnace belongs to that class of rotary cylindrical muffle-furnaces, which are provided with channels located in the walls of the furnace and serving for pre-heating the air.

My improvement in this furnace consists in conducting the air to the interior of the furnace in such a manner, that the air is compelled to pass through the material under treatment. The uninterrupted rotation of the furnace, in connection with the particular formation of the inner wall of the cylinder, prevents the material from entering into the air-inlet openings. The air may be conducted into the furnace either by means of wall-apertures or by means of a central pipe having lateral branch-pipes. In the first case the apertures are covered or protected by suitably arranged projections, in the other case, the branch-pipes extend into the ores. In any case, there is only so much or so little air allowed to get access to the ores, as is requisite for carrying through the roasting-process, the quantity being regulable so as to avoid any excess of that air.

My invention is illustrated in the accompanying drawing, in which—

Figure 1:
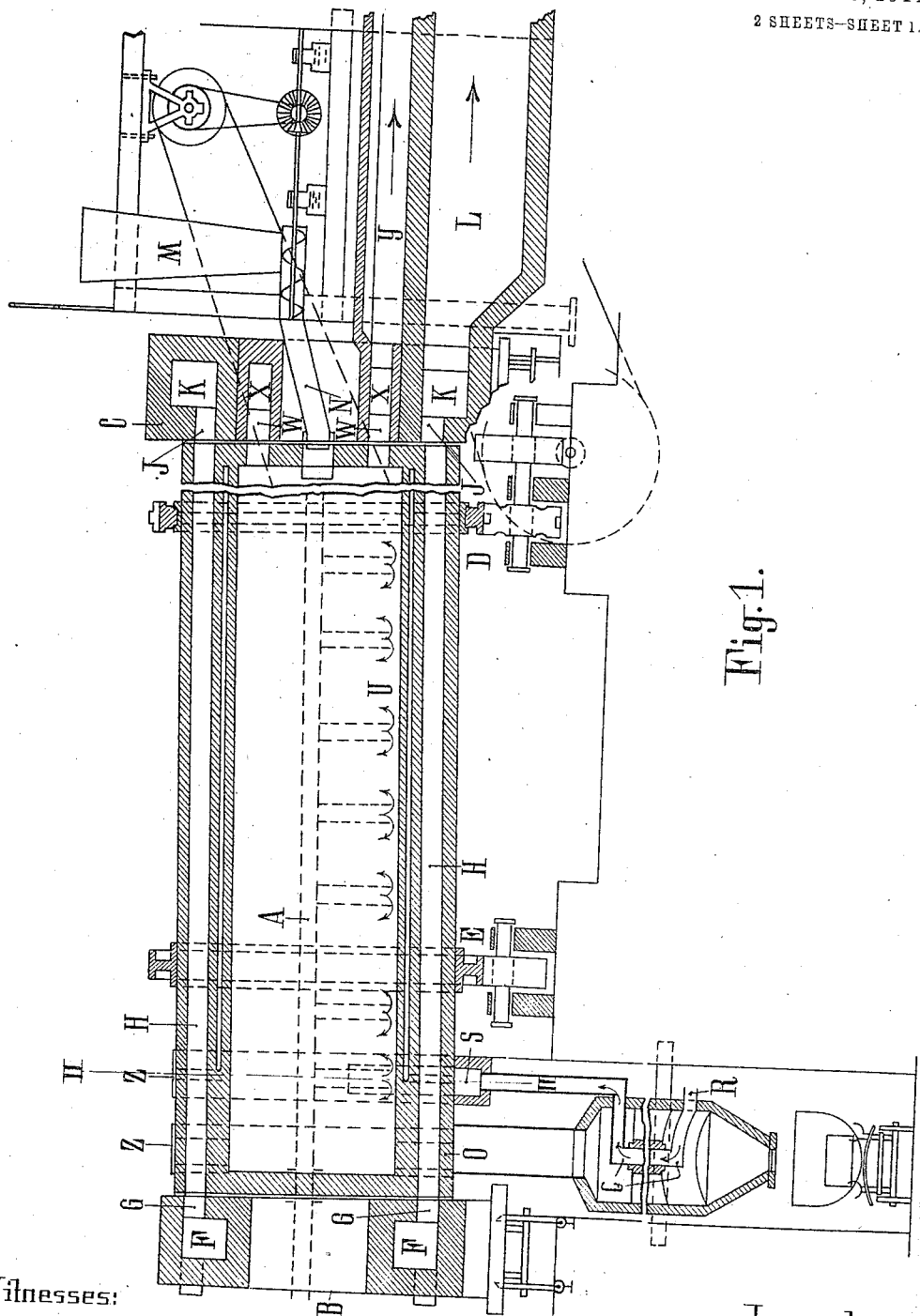
Figure 2:
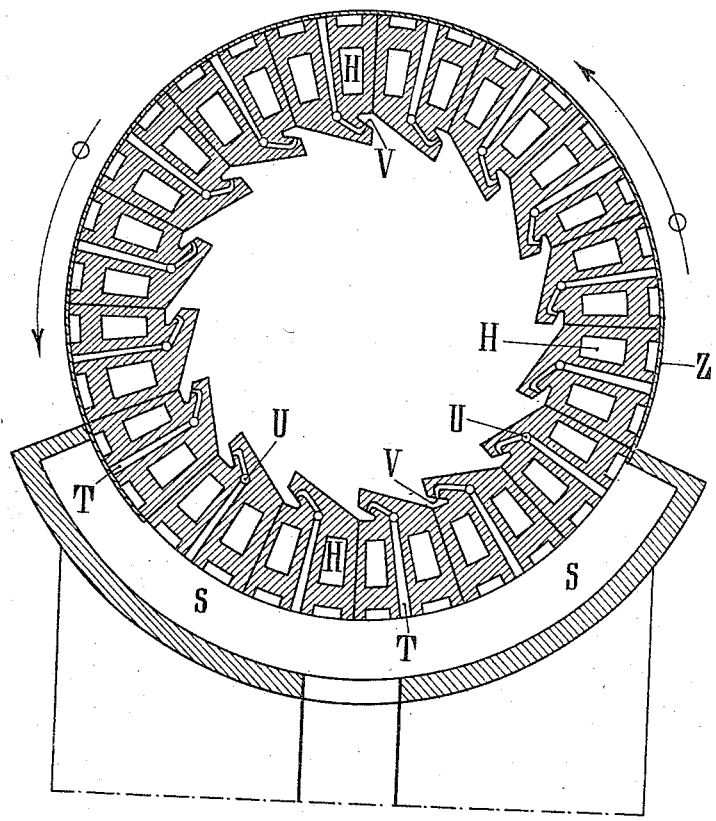

Figure 1 is a longitudinal section through the furnace, and Fig. 2 is a cross-section in line II—II of Fig. 1.

Referring to Fig. 1, A is the slightly inclined roasting-cylinder proper, which is supported by rolls E and rotated in known manner by a gearing D. This cylinder A is air-tight closed at its ends by portable walls B C. The heating-gases are conducted to the channels H of the cylinder A through annular channels F G of the front-wall B, and from said channels H they pass through annular channels J K of the charging-wall C to the flue L. The material to be roasted is fed into the cylinder A by means of the charging-device M N, and gets out of the cylinder through openings O. The roasted material is made use of for pre-heating the air passing to the material to be roasted, that air being conducted to the cylinder by means of a pipe Q and a channel S. The heated air passes from the main channel S through auxiliary channels T and distributing pipes U to the outlet-openings V. To prevent these openings from getting closed the channels T extend opposite to the direction of rotation of the cylinder or drum A. Those of the channels T which are not in connection with the feeding-channel S are covered or closed by a protective-mantle Z surrounding or encircling the respective portion of the drum. The pre-heated air is conducted by said channels S T U to and into and through the ores to be roasted. Having left the ores, the air passes through apertures W into an annular channel X of the wall C, and from this channel to an outlet-flue Y. By letting the main-feed-channel S extend only around a portion of the circumference of the drum or cylinder A, I obtain the advantage that the air gets only to those of the pipes U and the channels or nozzles V that are located just below and are thus practically covered with the ores under treatment. All the other channels T are closed by the mantle Z. The air is thus prevented from choosing any other way than through the ores.

In the practical employment of my improved furnace I keep the charging-device M constantly filled in order to prevent atmospheric air from finding access into the drum and being perhaps present in excess within the same.

Another object is to prevent any loss of heat.

Instead of employing channels such as S T U, I may make use of a central pipe having radial branch-pipes extending into the ores, as shown in dotted lines in Fig. 1. In this case, however, the air is not pre-heated to such a high degree as in the first-described case, and there is also the risk that the air issuing from the orifices of the branch-pipes flows partly instantly upward, along the outer surface of these pipes, through the interstices between these surfaces and the ore-material around them.

Having now described my invention, what I desire to secure by a patent of the United States is:

1. In a rotary metallurgical furnace of the class described, in combination, a rotatable roasting cylinder having distributing channels positioned lengthwise in the wall thereof, feeding nozzles communicating with said channels and with the interior of the cylinder, the outlet openings of said nozzles being provided with protective projections, whereby the material within the cylinder will be prevented from entering said nozzles, and means for feeding air to those of said channels whose feeding nozzles are covered by the material.

2. In a rotary metallurgical furnace of the class described, in combination, a rotatable roasting cylinder having distributing channels positioned lengthwise in the wall thereof, feeding nozzles communicating with said channels and with the interior of the cylinder, said nozzles extending in a direction opposite to the direction of rotation of said cylinder, whereby the material within the cylinder will be prevented from entering said nozzles, and means for feeding air to those of said channels whose feeding nozzles are covered by the material.

3. In a rotary metallurgical furnace of the class described, in combination, a rotatable roasting cylinder having distributing channels positioned lengthwise in the wall thereof, feeding nozzles communicating with said channels and with the interior of the cylinder, the outlet openings of said nozzles being directed toward the inner wall of the cylinder, whereby the material within the cylinder will be prevented from entering said nozzles, and means for feeding air to those of said channels whose feeding nozzles are covered by the material.

In testimony whereof I affix my signature in presence of two witnesses.

PAUL SCHMIEDER.

Witnesses:
GUSTAV WOITES,
JOHANN GIEROK.